United States Patent
Rowles et al.

(10) Patent No.: US 10,017,251 B2
(45) Date of Patent: Jul. 10, 2018

(54) CARGO RESTRAINT FOR AIRCRAFT

(71) Applicant: Ancra International, LLC, Azusa, CA (US)

(72) Inventors: John F. Rowles, Fullerton, CA (US); Edward H. Moradians, Woodland Hills, CA (US); Victor Bassly, West Hills, CA (US)

(73) Assignee: Ancra International, LLC, Azusa, CA (US)

( * ) Notice: Subject to any disclaimer, the term of this patent is extended or adjusted under 35 U.S.C. 154(b) by 0 days.

(21) Appl. No.: 15/174,442

(22) Filed: Jun. 6, 2016

(65) Prior Publication Data
US 2017/0349284 A1    Dec. 7, 2017

(51) Int. Cl.
*B60P 7/08*    (2006.01)
*B64D 9/00*    (2006.01)
*B64D 11/06*    (2006.01)

(52) U.S. Cl.
CPC .............. *B64D 9/003* (2013.01); *B60P 7/08* (2013.01); *B64D 11/0696* (2013.01)

(58) Field of Classification Search
CPC ........ B64D 9/003; B64D 11/0696; B60P 7/08
USPC ..... 410/77–80, 92, 94, 95; 244/118.1, 137.1
See application file for complete search history.

(56) References Cited

U.S. PATENT DOCUMENTS

| | | | | |
|---|---|---|---|---|
| 4,457,649 | A | * 7/1984 | Vogg ................. | B64D 9/003 410/69 |
| 9,475,581 | B2 | * 10/2016 | Kuppan ............... | B60P 7/0892 410/77 |
| 2002/0104925 | A1 | 8/2002 | Fitzgerald et al. | |
| 2007/0086871 | A1 | * 4/2007 | Brekken .............. | B64D 9/003 410/77 |
| 2013/0145593 | A1 | 6/2013 | Holzner et al. | |

FOREIGN PATENT DOCUMENTS

DE         31 07 745 A1    9/1982
DE    10 2010 060 467 A1    3/2012

OTHER PUBLICATIONS

German Examination Report for Application No. 10 2016 114 479.7, dated Mar. 27, 2017, 14 pp.

* cited by examiner

*Primary Examiner* — Stephen Gordon
(74) *Attorney, Agent, or Firm* — Brinks Gilson & Lione

(57) ABSTRACT

Systems for restraining palleted cargo within an aircraft are provided. A first system operates to provide vertical and outboard lateral support to cargo at a location where the opposite ends of the system are connected to surfaces that are aligned at different orientations, for example, one end connected to a horizontal floor and the second end connected to a sidewall of the fuselage of the aircraft. A second system operates to provide aft, vertical, and outboard lateral support to cargo upon a pallet proximate to its corner, and at a location where a portion of cargo extends above a stay out zone of the aircraft.

14 Claims, 12 Drawing Sheets

CARGO RESTRAINT FOR AIRCRAFT

TECHNICAL FIELD

This disclosure relates to cargo control equipment, and specifically to cargo control equipment that is configured to be used on an aircraft to support cargo pallets in various directions of movement during flight.

BRIEF SUMMARY

A first representative embodiment of the disclosure is provided. The embodiment includes a system to restrain palleted cargo within an aircraft. The system includes a first fitting that is configured to be removably attached to a first track rigidly mounted upon a horizontal aircraft surface, the first fitting comprising a first portion configured to engage the track and a second portion disposed perpendicular to the first surface. An elongate bar is provided that is fixable to the second portion of the first fitting, the elongate bar comprising an extended portion that extends in a cantilevered fashion from the first fitting in a first direction, the elongate bar comprising a second portion that extends from the extended portion wherein an axis through the second portion is perpendicular to an axis through the extended portion.

A second representative embodiment of the disclosure is provided. The embodiment includes a system for restraining palleted cargo within an aircraft. The system includes first and second beams connected together such that they are movably disposed with respect to each other in a first direction at a joint and fixed with respect to each other in two other mutually perpendicular directions. The first beam when installed within an aircraft, is rigidly mountable to a first fixed structure of an aircraft, the second beam, when installed, is rigidly mountable to a second fixed structure of the aircraft, wherein the second fixed structure is a horizontal surface and the first fixed structure is disposed a perpendicular or oblique angle with respect to the horizontal surface.

Other systems, methods, features and advantages of the invention will be, or will become, apparent to one with skill in the art upon examination of the following figures and detailed description. It is intended that all such additional systems, methods, features and advantages be within the scope of the disclosure, and be encompassed by the following claims.

DETAILED DESCRIPTION OF THE DRAWINGS AND THE PRESENTLY PREFERRED EMBODIMENTS

Figure 1:
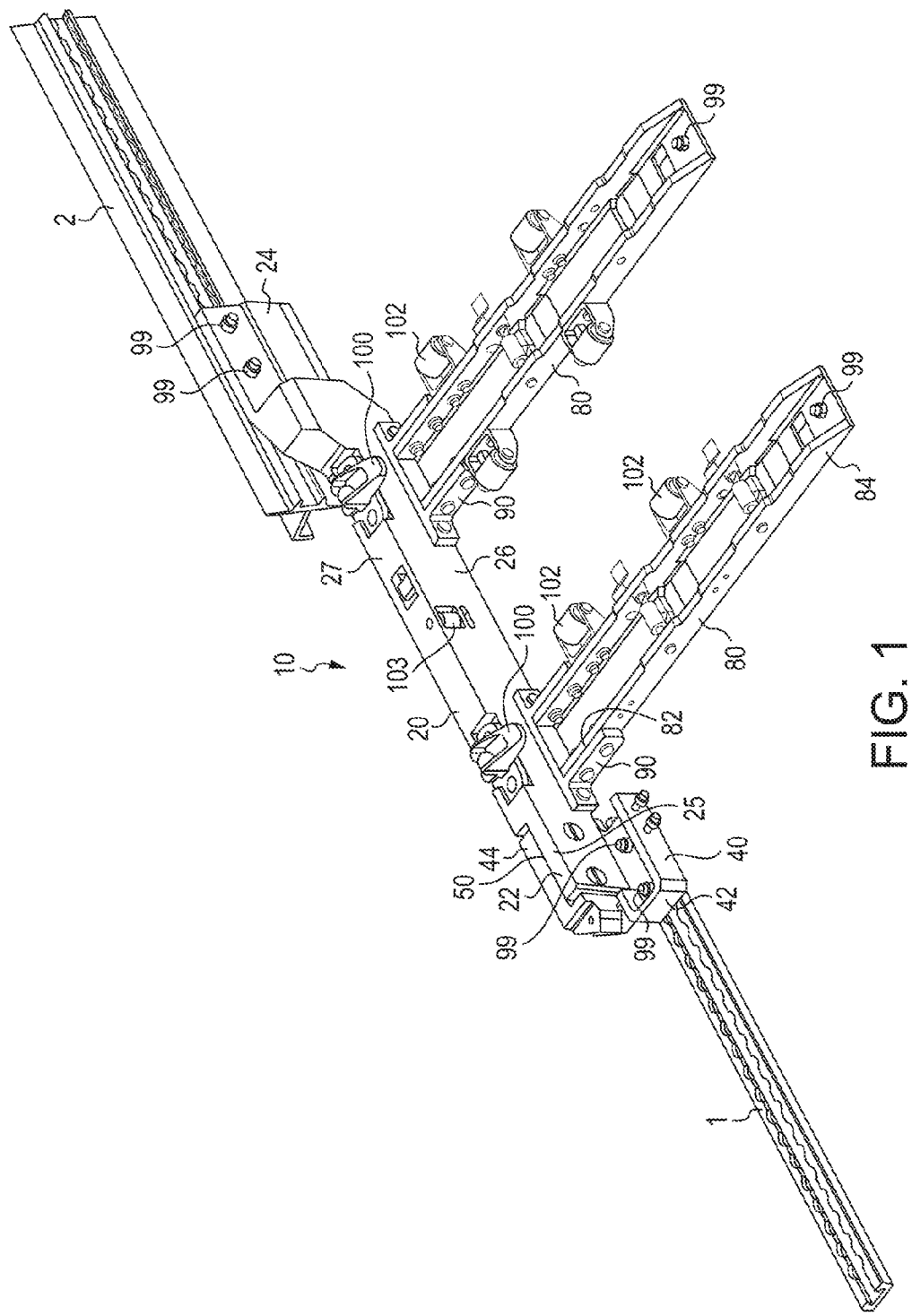
FIG. 1 is a perspective view of a system for laterally and vertically supporting a pallet of cargo.

Turning now to FIGS. 1-8, a system 10 for laterally and vertically supporting cargo within an aircraft fuselage is provided. In some embodiments, the system may be specifically used to support cargo within pallets that are conventionally used within aircraft, such as to support pallets that are configured for use within BOEING® 737-800 aircraft, and specifically at a location bridging a position proximate to the FS 520 position to a position proximate to the FS 540 position, and in some embodiments specifically be supported by a side wall of the fuselage starting at the FS 542.45 position. The term "FS XXX" position is "Fuselage Station" (sometimes referred to as Station or "Sta") and refers to the distance in inches from a datum line in the forward end of the aircraft. While the system 10 is specifically described for use within a specific location with the 737-800 aircraft, one of ordinary skill in the art with a thorough review of this specification and figures would understand that the system 10 could also be successfully used in other locations within the 737-800 aircraft, or other aircraft, or other means of transportation where cargo control is necessary such as tractor trailers, the maritime industry, railcars, or the like. One of ordinary skill in the art will understand that the system provides for supporting cargo in lateral and vertical directions where the certain supports for the restraint system need to be fixed to the structure at both a location along the floor of the aircraft (or other type of vehicle) as well as a location along a sidewall of the aircraft, with supports bridging these two locations. Additionally or alternatively, the system provides for supporting cargo across a location within an aircraft (or other type of vehicle) where the aircraft is designed to flex during use up to a certain design limit.

The system 10 includes a first beam 20 and a second beam 40 that are each fixed together with a joint 50, such that the first and second bars 20, 40 can flex with respect to each other in at least one direction. The first beam 20 is configured to be fixed to a side wall of the fuselage, and specifically to a track 2 disposed upon the side wall of the aircraft. The second bar 40 is configured to be fixed to a floor of the fuselage, and specifically to a track 1 disposed forward of side wall track 2 and on the opposite side of a flex point of the aircraft from the side wall track 2. As discussed further below, the first beam 20 may be configured to support, either directly or via additional components, various structures that provide outboard lateral and vertical support to a pallet of cargo disposed proximate to the first bar.

The first beam 20 is an elongate member that extends between first and second ends 22, 24. The first end 22 establishes a joint 50 with a portion of the second beam 40. In some embodiments, the joint 50 between the first and second beams 20, 40 may be a half lap joint, as depicted in the figures, while in other embodiments, the joint 50 may be a butt joint or other types of joints known in the art. Additional details of the first and second beams 20, 40 that form the joint 50 are discussed below. The second end 24 of the first beam 20 may be fixed to a side wall of the fuselage, such as a seat track 2 that is fixed to the side wall, with one or more fasteners 99 that are known in the art to fix members to a fixed surface, such as a conventional seat track, such as a L-track or similar type of track.

In certain aircraft, such as the BOEING® 737-800 aircraft, the seat track 2 is mounted upon a side wall portion of the fuselage of the aircraft, and therefore the second end 24 of the first beam 20 is configured to engage the seat track 2 upon the side wall. In an embodiment where the seat track 2 is positioned around the FS540 location upon the aircraft, the first beam 20 is configured such that its second end 24 has an oblique planar surface 24a (parallel to axis 2a) that, when the first beam 20 is installed, is positioned at an oblique angle α with respect to a vertical axis 1000 through the aircraft. In some embodiments, the angle α is an acute angle, such as about 5 degrees, 10 degrees, 20 degrees as well as any angle within the range of 5 degrees to 20 degrees. In one embodiment, the angle α is 15.8 degrees.

In some embodiments, the second end 24 of the first beam 20 is recessed outboard from the first side surface 26 of the first beam 20, which as discussed below, is a surface that a pallet 2000 (FIG. 2a) bears against such that the first side surface 26 provides lateral support for a pallet 2000 (either based upon direct contact between an edge 2001 of the pallet 2000 or by supporting a roller 103 that the edge 2001 of the pallet bears against. In this embodiment, the pallet 2000 does not contact or otherwise bear against the second end 24 of the first beam 20.

Figure 2:
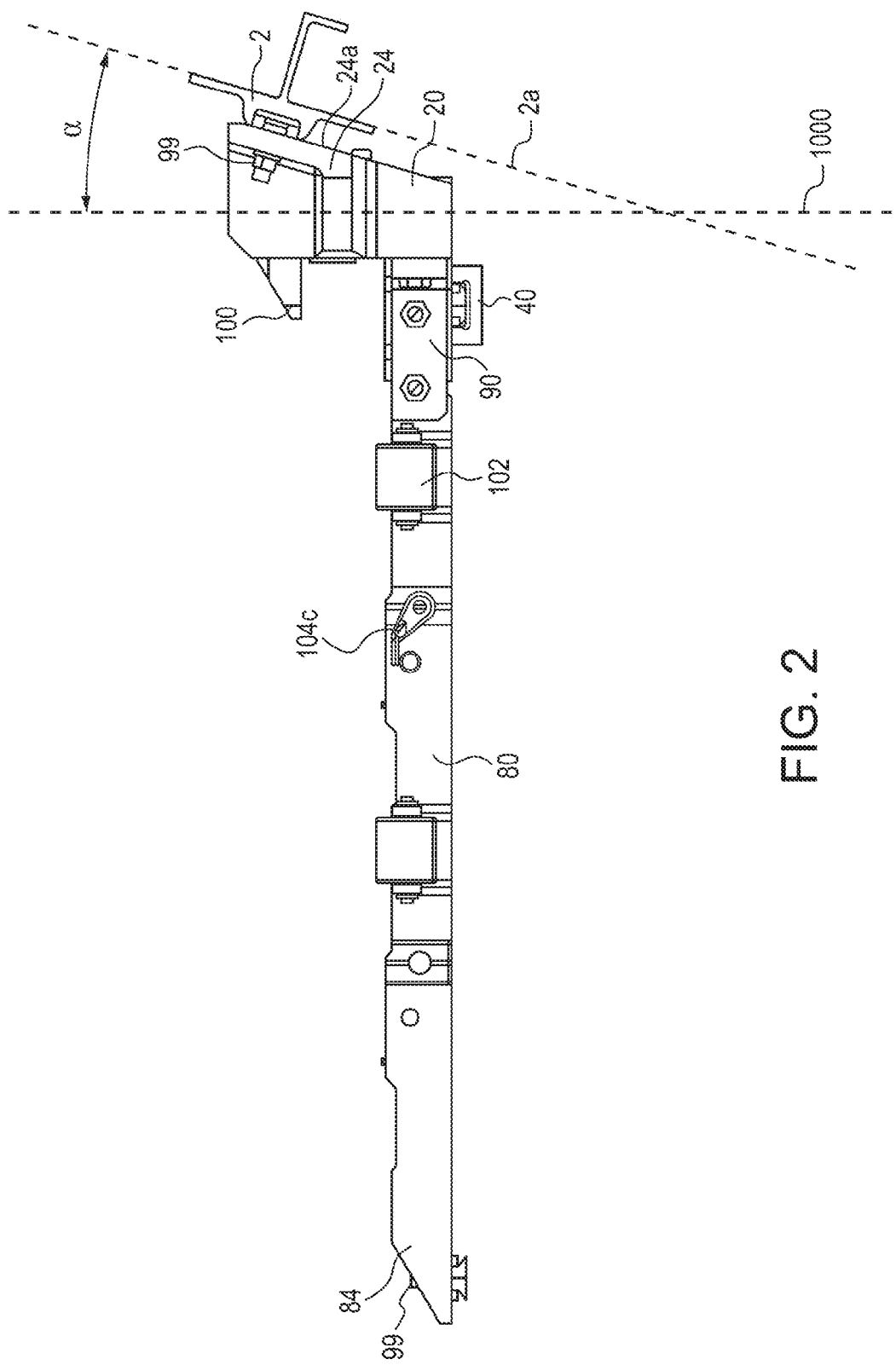
FIG. 2 is a side view of the system of FIG. 1 when viewed from an aft direction of within the aircraft.
Figure 2A:
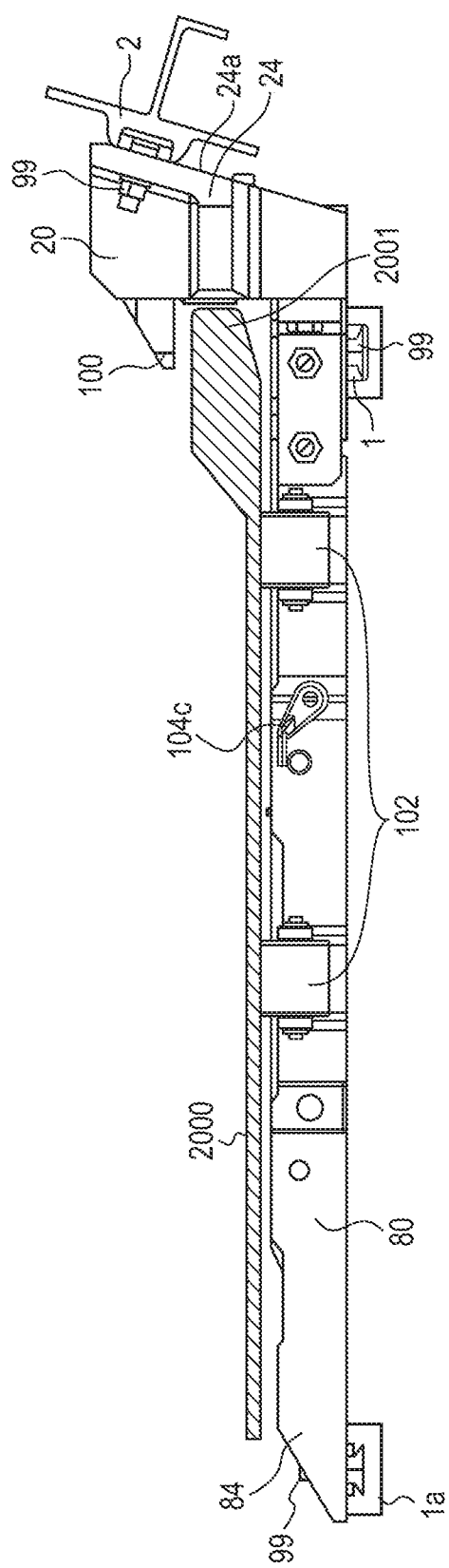
FIG. 2a is the view of FIG. 2 with the system supporting a pallet.
Figure 3:
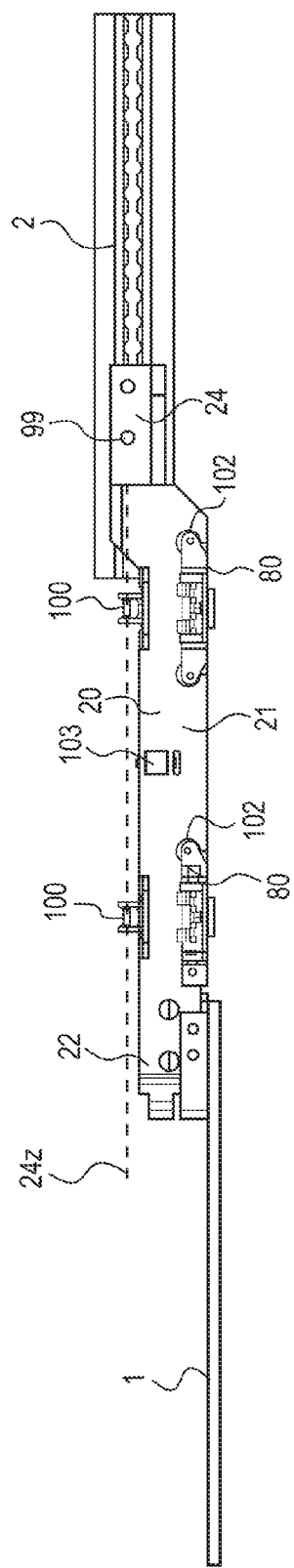
FIG. 3 is a side view of the system of FIG. 1 when viewed from a centerline of the aircraft.
Figure 4:
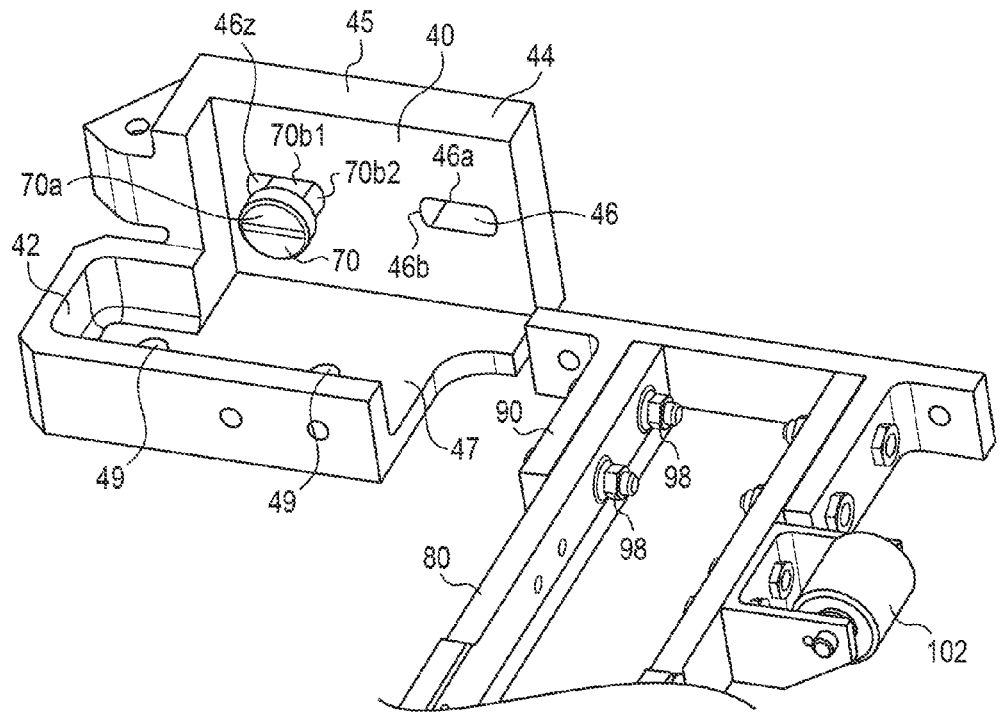
FIG. 4 is a perspective view of the second beam, the bracket, and a portion of the cross-track of the system of FIG. 1.
Figure 4A:
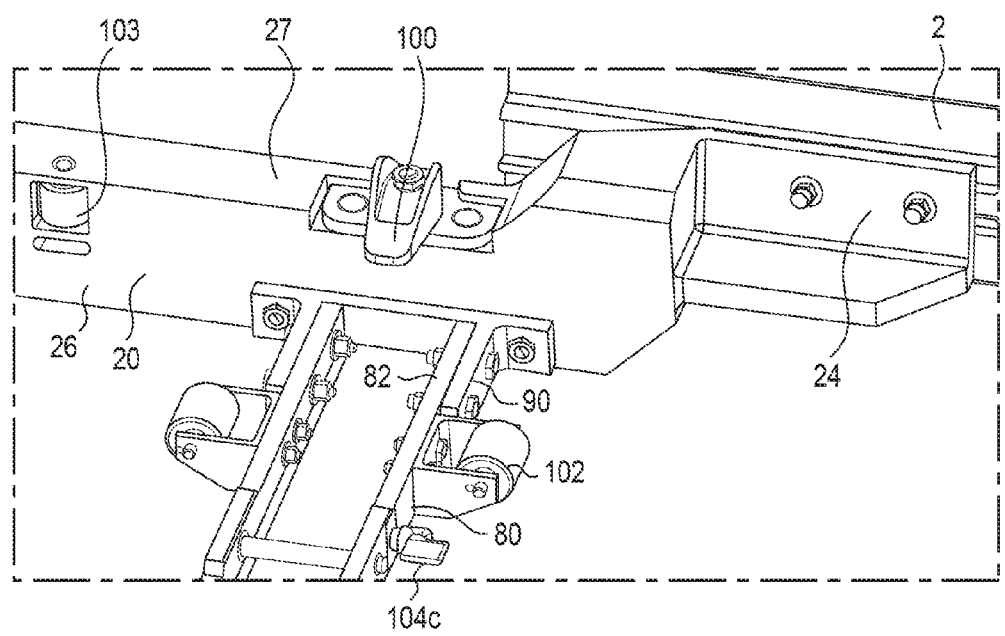
FIG. 4a is a perspective view of a second end portion of the first beam depicted fixed to a track disposed upon a side wall of the fuselage of an aircraft.
Figure 5:
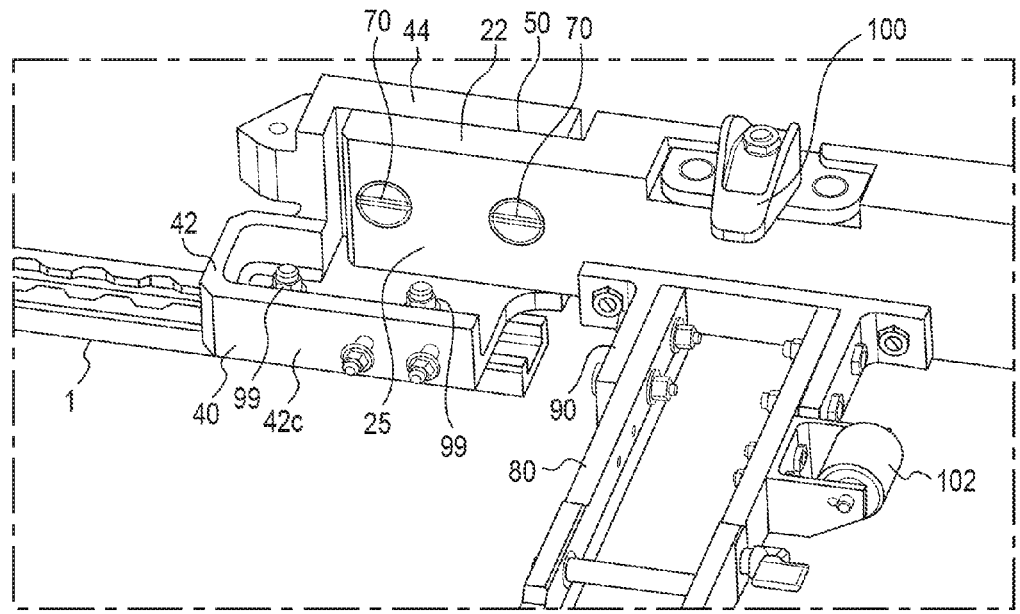
FIG. 5 is a detail perspective view depicting the half lap joint between the first and second beams and depicting the second beam fixed to a track disposed upon a floor of the aircraft.
Figure 6:
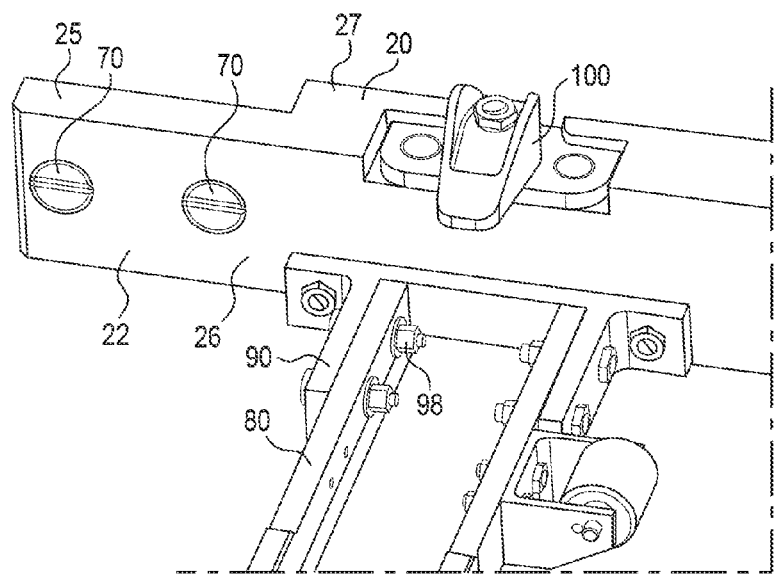
FIG. 6 is the view of FIG. 5 with the second beam and associated components removed.
Figure 7:
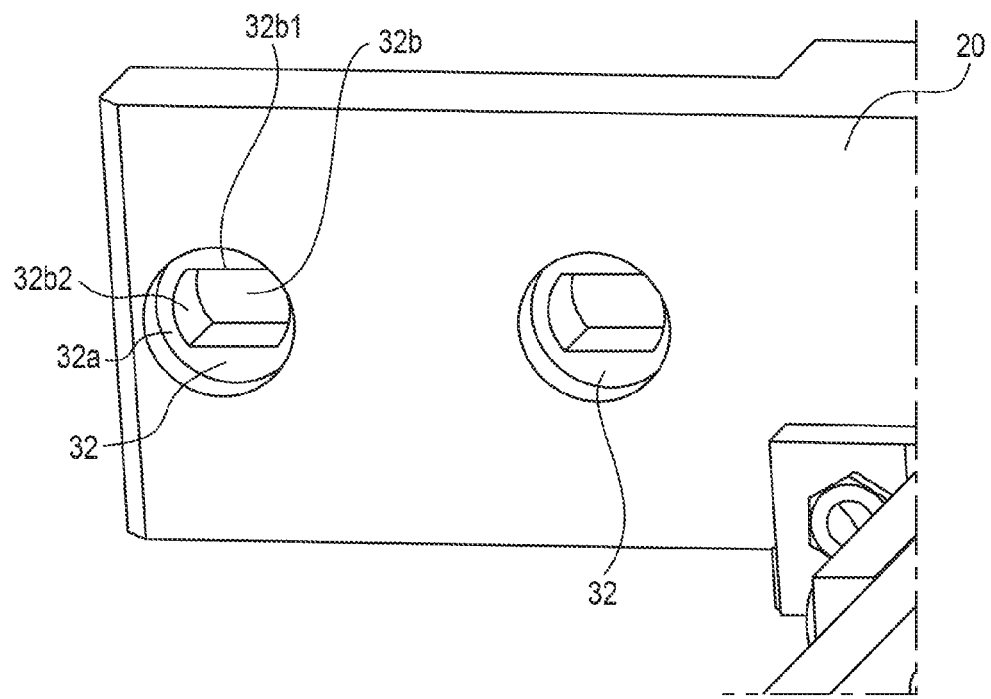
FIG. 7 is a detail view of the half lap joint portion of the first beam.
Figure 8:
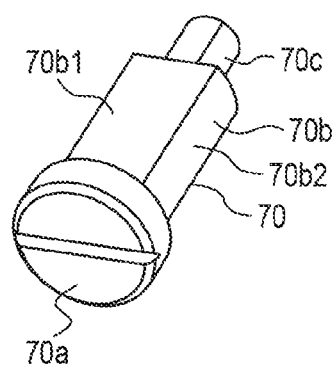
FIG. 8 is a perspective view of a fastener used to fix the first and second beams together in the half lap joint.

In some embodiments, as best shown in FIGS. 2 and 3, the second end 24 of the first beam 20 is configured such that the one or more fasteners 99 extend through apertures in the second end (not shown, but one of ordinary skill would comprehend where the apertures for the fasteners 99 would be positioned with reference to at least FIGS. 2 and 3) that are disposed vertically above a top surface 27 of the first beam 20 along its central portion 21, as depicted with the broken line 24z of FIG. 3. In some embodiments, the second end 24 of the first beam 20 may include conventional alignment features for interacting with the track 2 at positions other than where the one or more fasteners 99 engage the track 2.

The first beam 20 may directly support and align one or more different restraints for pallets 2000 of cargo disposed proximate thereto, and specifically at the central portion 21 of the first beam 20. For example, the first beam 20 may support one, two, or more "flippers" 100 in some embodiments upon the top surface 27 thereof, which are aligned to provide a vertical restraint to a pallet 2000. Specifically, the flippers 100 include a cantilevered arm that extends inboard from the first beam 20 and extends above an extended bumper portion of the pallet 2000.

The first beam 20 may additionally support one or more rollers 103 that are mounted upon (or within a portion of) the central portion 21, such that the roller 103 extends from the first side surface 26 and extends inboard to engage an edge of a pallet 2000 to provide lateral support, and to assist with for to aft movement of the pallet 2000 within the aircraft.

The second beam 40 is provided to support the first end 22 of the first beam 20 and is fixed to a fixed track 1 within the aircraft, such as a seat track 1 disposed upon the floor of the aircraft, which may be an L type track or another type of track or support structure. In some embodiments, the first end 42 of the second beam 40 is fixed to the seat track 1, while the second end 44 forms the joint 50 with the first beam 20.

The first end 42 of the second beam 40 may include a ledge 42a that rests upon the floor of the aircraft and the seat track 1 and may include one, two, or more apertures (not shown) through which the fasteners 99 that mate with the seat track 1 extend. The first end 22 of the first beam 20 may rest upon the ledge 42a, such that the entire first beam 20 may be disposed above the floor of the aircraft when installed. The first end 42 of the second beam 40 may additionally include conventional alignment features for interacting with the track 1 at positions other than where the one or more fasteners engage the track 1.

The first end 42 of the second beam 40 may include a wall 42c which provides structure for supporting additional structural members of a cargo support system, such as cross beams for supporting conveyance rollers (similar to those depicted as 102), locking structures and the like.

The second end 44 of the second beam 40 may serve as a portion of the joint 50 with the first beam 20. In embodiments where the joint 50 is a half lap joint, the second end 44 is a portion of the half lap joint, and includes a surface that makes surface to surface contact with a surface of the first end 22 of the first beam 20, which forms another portion of the half lap joint. Each of the first and second beams 20, 40 within the joint 50 include one, two, or more apertures through which a fastener 70 extends to fix the first and second beams 20, 40 with respect to each other when assembled. The apertures 46 of the second end 44 of the second beam 40 are best understood with reference to FIGS. 4 and 8. In some embodiments, the second end 44 includes two apertures 46, which are formed with the same geometry to each receive a fastener 70 with the same geometry.

The aperture 46 may be a slot with top and bottom flat walls 46a and curved side walls 46b that connect the adjacent ends of the flat walls 46a. The flat walls 46a may be separated a distance just larger than a diameter of the fastener 70 across a central portion 70b between corresponding flat walls 70b1 of the fastener 70, discussed in detail below. The slot 46 may have a width (between the opposed curved walls 46b) that is larger than the diameter of the fastener 70 across the central portion 70b between the opposed curved walls 70b2, such that the fastener 70, when installed can slide within the slot 46 (in the fore and aft directions within the aircraft). For example, the width of the slot 46 may be a distance greater than the diameter of the central portion of the fastener 70 between the curved walls 70b2 by ⅛ inch, ¼ inch, ⅜ inch, ½ inch or in other embodiments the width of the slot 46 may be larger than the fastener 70 within the range of ⅛ to 1 inch, inclusive of all dimensions within this range. A specifically preferred width may be ⅜ inches wider than the diameter between the curved walls 70b2 of the fastener 70. One of ordinary skill in the art will comprehend that that the width of the apertures 46 with respect to the size of the fastener 70 will allow the fastener 70 to slide within the aperture 46, while the slot will constrain the fastener in the vertical direction, and the fastener 70 will constrain the inboard/outboard lateral direction of the first and second beams 20, 40 with a nut (not shown but conventional) disposed upon a threaded end portion 70c of the fastener (with the head 70a bearing upon the first end 22 of the first beam 20) to tighten the surface to surface connection between the first and second beams 20, 40 at the joint.

The first end 22 of the first beam 20 includes one, two, or more apertures 32 (and the same number as the number of apertures 46) such that the respective number of fasteners extend through the aligned apertures 46 and 32. The apertures 32 each may include a countersink portion 32a, which extends from the front side 26 of the first beam 20 and a collinear fixing portion 32b. The countersink portion 32a may have a diameter/geometry just larger than a diameter of the head 70a of the fastener 70 and a depth the same or just larger than a thickness of the head 70a such that the head 70a rests within the countersink portion 32a when installed.

The fixing portion 32b may have a geometry that is similar to the central portion 70b with the fastener, with a set of opposed flats 32b1 and a set of curved sides 32b2 that connect the neighboring ends of the opposed flats 32b1. The size of the fixing portion 32b may be just larger than the size of the central portion 70b of the fastener, such that the fastener can be slid into the aperture, but there is minimal "play" possible between the fastener 70 and the aperture 32. As can be understood, when the fastener 70 extends within the fixing portion 32b the fastener 70 is constrained from rotating about its axis.

With review of FIGS. 4-8, one of ordinary skill in the art will understand that the joint 50 between the first and second beams 20, 40 is configured such that the first and second beams 20, 40 are rigidly mounted together and are rigidly fixed with respect to each other in the vertical direction and in the inboard and outboard lateral directions (when the fastener is fixed to the first and second beams 20, 40 with a nut and washer). The first and second beams 20, 40 are free to slide with respect to each other in the fore and aft direction along the longitudinal axis of the aircraft (when installed), or in other words, in a direction parallel to the longitudinal axis through the first beam 20. As discussed elsewhere, when the system 10 is installed spanning between the FS520 and about the FS540 points along the BOEING® 737-800 aircraft, the system 10 spans a design flex point within the aircraft. The system 10's extendibility in the fore and aft direction allows the system 10 to lengthen or shorten as the flex point of the aircraft flexes, such that the system 10 does not act as a rigid beam upon the fuselage of the aircraft, which might limit the flexibility of the fuselage.

In some embodiments, the system 10 supports one or more lateral cross tracks 80 that each may support one, two, four, or more longitudinal rollers 102 thereon, which are configured to support the bottom of a pallet 2000 and allow the pallet to be readily moved within the fuselage thereon. In the figures, the left-most cross track 80 is depicted with two rollers, both extending in the same direction, and the right most cross-track 80 is depicted with four rollers 102, two from each side. The cross tracks 80 may support these or different numbers and types of (and sizes) of rollers 102 as appropriate (which will be understood by one of ordinary skill after a review of this disclosure) based upon the type of pallet 2000 to be retained by the system 10. The cross tracks 80 may also support different types of support devices, such as ball in socket rollers that allow for pallets to move in different directions thereupon.

While the embodiment discussed and depicted herein the one or more cross tracks 80 being supported by the first beam 20, in other embodiments, the cross tracks 80 could be supported by the second beam 40, with the joint 50 between the first and second beams disposed proximate to the second track 2 upon the side wall of the fuselage. In other embodiments, one cross track 80 may be supported upon the first beam 20 and another cross track 80 may be supported upon the second beam 40. One of ordinary skill in the art with a thorough review of the subject specification will understand that other geometries of the system may be provided, such as when the system 10 is configured for use in other locations upon an aircraft (or tractor trailer, boat, railcar, etc.) where the system 10 connects to a floor location and a side wall location, and in some embodiments where the system bridges a flexpoint and therefore must be flexible in at least one direction when mounted thereto.

The cross tracks 80 may be rigidly mounted to the first beam 20 (or in other embodiments the second beam 40, or both) such that they are supported thereto at the location of mounting and not additionally directly supported by the floor (or other surface) of the fuselage at one end of the cross-track 80. In some embodiments, the first end 82 of the cross track 80 may be directly fixed to the first beam 20 (such as abutting the first side wall 26, or such as resting upon the top wall 27), while in other embodiments depicted in the figures a bracket 90 may be provided to fixedly bridge the first beam 20 and the cross track 80. In some embodiments, the bracket 90 may be shaped as a Greek letter "pi" with the cross track 80 disposed between the two legs of the "pi" and the large flat top of the "pi" resting against the first side wall 26 of the first beam and fixed thereto. The cross track 80 and first beam 20 (and the bracket 90, when provided) may be fixed with respect to each other with a plurality of fasteners 98.

Figure 1A:
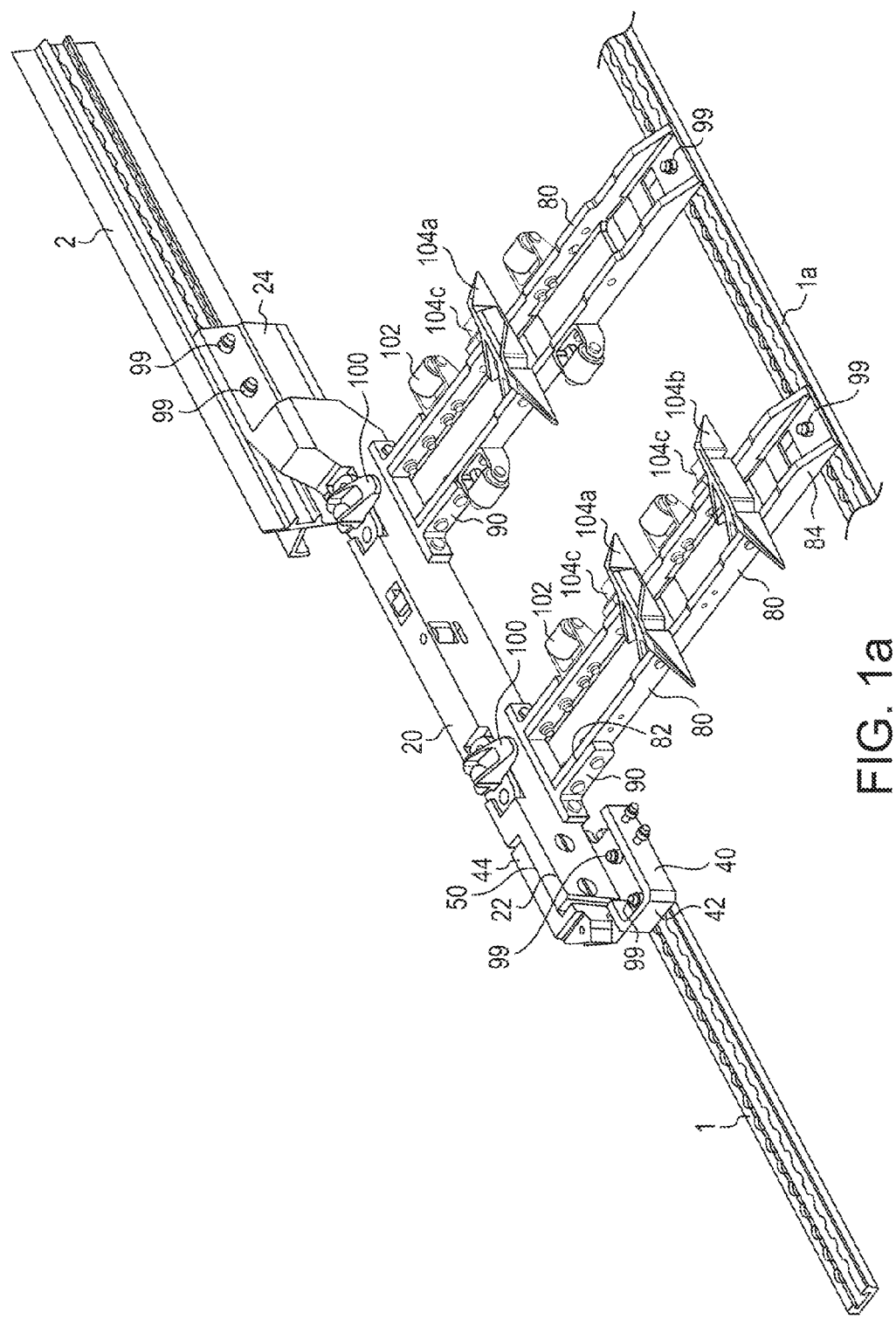
FIG. 1a is the view of FIG. 1 with cross-tracks supported by the first bar of the system supporting pivotable lateral and vertical supports.
Figure 1B:
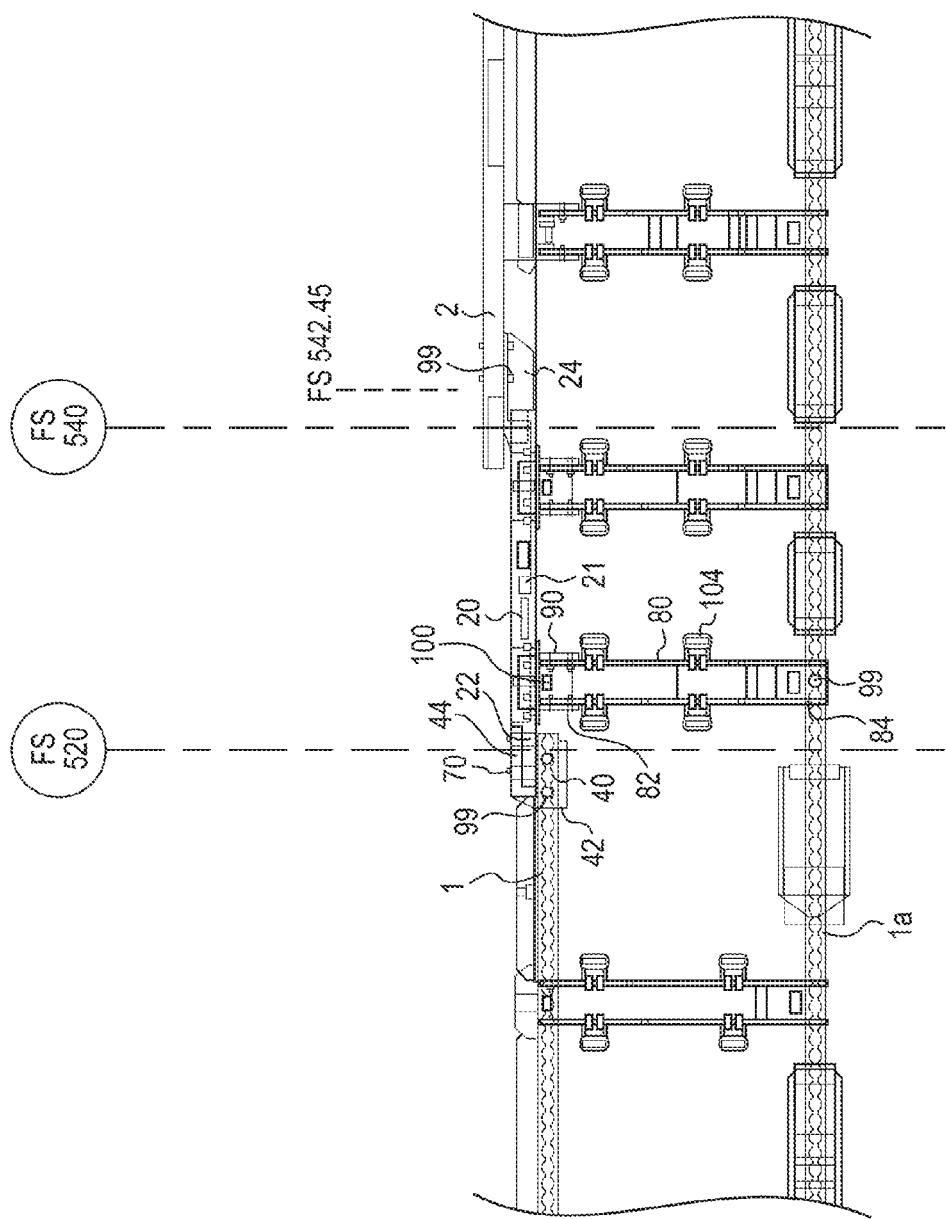
FIG. 1b is a top view of the system of FIG. 1 installed within an aircraft.

The second end 84 of the cross track 80 may be fixed to the floor of the fuselage, and specifically to a seat track 1a that is disposed inboard of the first seat track 1 (FIG. 1a). The second end 84 of the cross track 80 may be fixed to the seat track 1a with one or more conventional fasteners.

In some embodiments depicted in FIG. 1a, one, some, or all cross tracks 80 may support movable restraints 104a, 104b. The movable restraints 104a, 104b, when positioned in a restraining position (as shown in FIG. 1a) provide lateral outboard restraint for a pallet, when the size or orientation of the pallet used at that location would result in the side edge of the pallet 2000 not reaching the first side wall 26 of the first beam 20. The movable restraints 104a, 104b may additionally include a roof that, when positioned in a restraining position, is disposed above the edge of the pallet to provide vertical support. FIG. 1a depicts multiple sets of movable restraints 104a, 104b, which may be provided upon a cross track 80 and selectively positioned (or stowed) depending upon the size of the pallet 2000 to be restrained. The movable restraints 104 are operated with an operator 104c, and the movable restraints 104 are well known in the art.

FIGS. 1-8 depict a system that is configured to restrain a pallet of cargo at the right or starboard side of the fuselage (when looking forward within the fuselage). One of ordinary skill in the art will understand that the system 10 can be constructed in the opposite geometry as depicted herein such that it is configured to be installed to support cargo (at the same FS position) on the left or port side of the fuselage of the aircraft. As discussed herein, the system 10 may also be used in other positions within an aircraft, or other modes of transportation where there is a need to support cargo or other objects therein.

Turning now to FIGS. 9-13, another system 200 for laterally and vertically supporting cargo within an aircraft fuselage is provided. In some embodiments, the system 200 may be specifically used to support cargo within pallets that are conventionally used within aircraft, such as the BOEING® 737-800 aircraft, while in other embodiments, the system 200 may be used to support pallets of cargo in other aircraft, or in other means of transportation such as tractor trailers, the maritime industry or on railcars.

Figure 11:
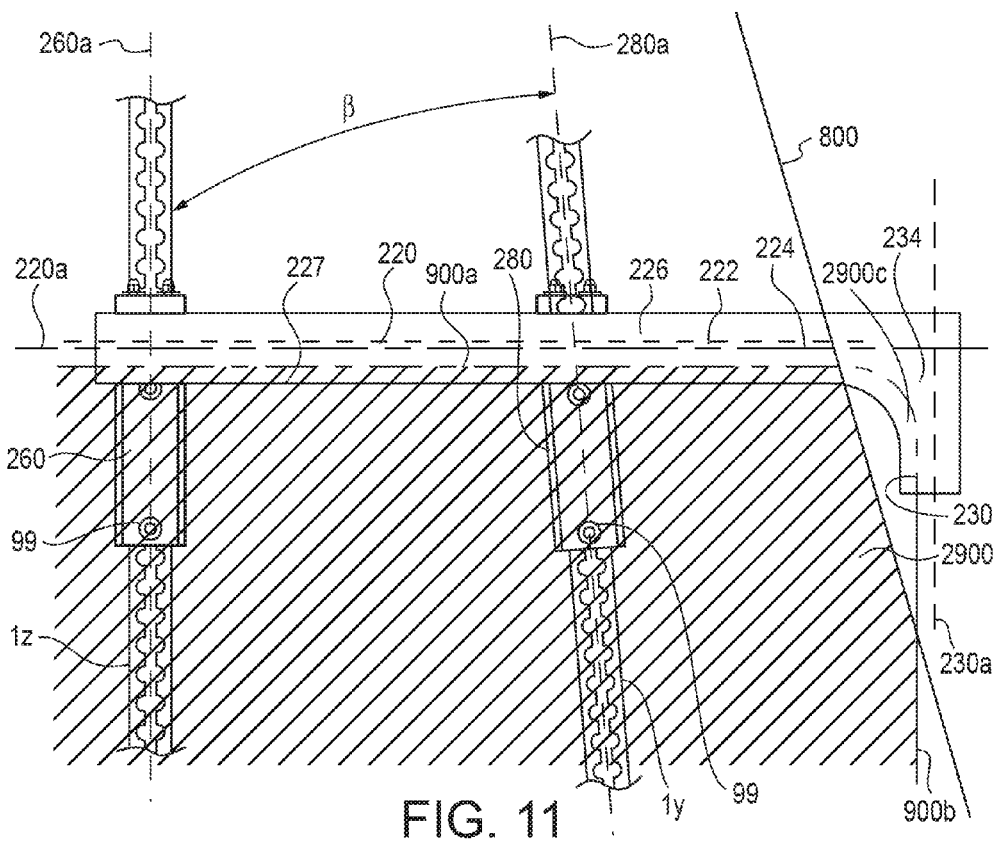
FIG. 11 is a top view of the system of FIG. 9 depicting the system vertically and laterally supporting a pallet of cargo.
Figure 12:
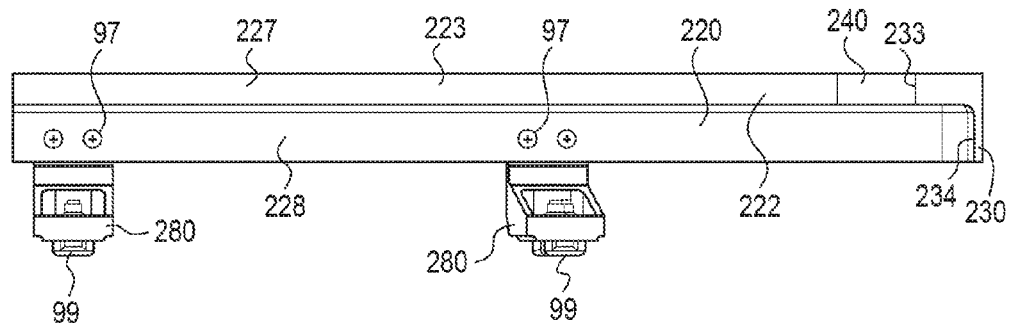
FIG. 12 is a front view of the system of FIG. 9.

In some embodiments, the system 200 may be implemented at a location in the aft end of the BOEING® 737-800 aircraft, where the "stay out zone" 800 (depicted as the area to the right of line 800 in FIG. 11) runs proximate to flat seat track 1y (FIG. 11). The location of the stay out zone 800 prevents using conventional cargo control systems to restrain cargo pallets in this area. The system 200 is configured to provide aft and outward lateral support for a pallet 2900 while allowing a portion, such as at least a portion of the edge 2901 to extend over the line 800 and into the stay out zone of the aircraft, while being supported by components that are fixed to the aircraft from outside of the stay out zone.

Figure 9:
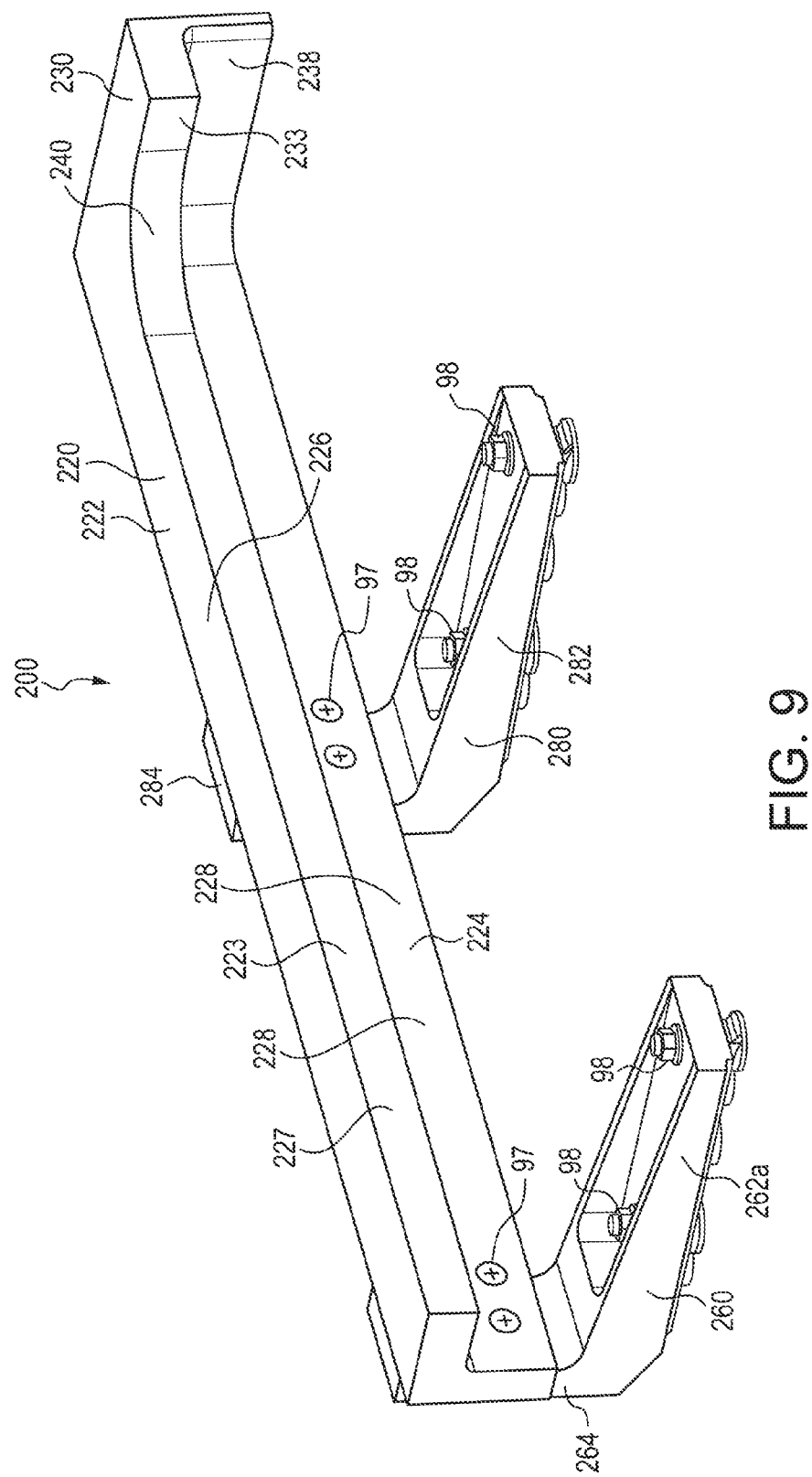
FIG. 9 is a perspective view of another system for laterally and vertically supporting a pallet of cargo.
Figure 10:
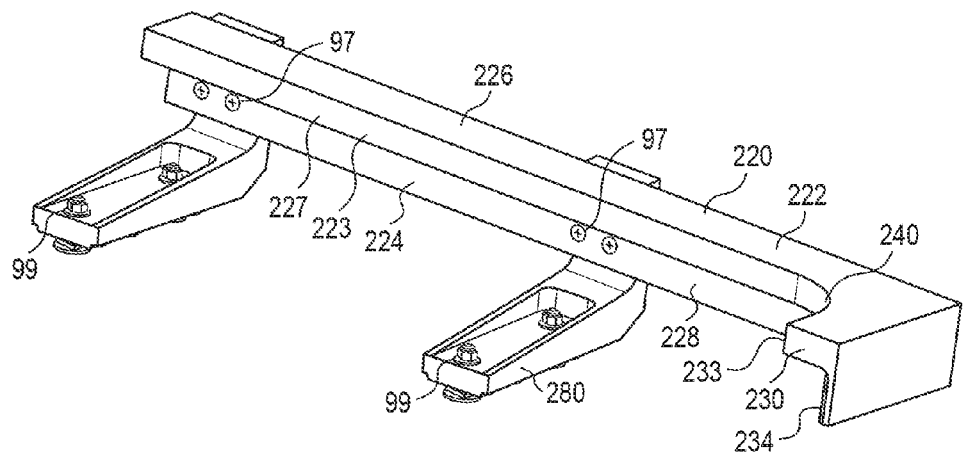
FIG. 10 is another perspective view of the system of FIG. 9.

The system 200 includes an elongate bar 220 that is fixed to at least one fitting 260, and in some embodiments a second fitting 280. For the sake of brevity, the system 200 will be discussed herein with respect to attachment to both a first and a second fitting 260, 280. One of ordinary skill in the art will understand that the elongate bar 220 may be attached to and supported by only one fitting, such as the first fitting 260 or the second fitting 280, or it can be attached to and supported by three or more fittings. The elongate bar 220 includes a first portion 223 that fixes to the first and second fittings 260, 280 and includes a cantilevered portion 222 that extends from the second fitting 280 in a cantilevered fashion, as shown in FIGS. 9 and 10. The elongate bar 220 additionally includes a second portion 230 that extends from the cantilevered portion 222 of the elongate bar 220. The second portion 230 may extend in a direction that is along an axis through the second portion 230a and is perpendicular to a longitudinal axis 220a through the elongate portion 223 (FIG. 11). In some embodiments, the system 200 is installed within an aircraft such that the cantilevered portion 222 extends laterally outboard toward a sidewall of the fuselage of the aircraft and the second portion 230 extends in a forward direction within the aircraft. As depicted in FIG. 11, a portion of the cantilevered portion 222 extends into the stay out zone of the aircraft, and all or a portion of the second portion 230 extends within the stay out zone. The second portion 230 may be fully supported by the cantilevered portion 222 of the elongate bar 220 and therefore does not make contact with or directly receive support from structure of the aircraft.

The elongate bar 220 may include a planar top surface 226 that forms a ledge 227. The ledge 227 includes a front surface 227a. The ledge 227 extends from a wall 228, which as discussed further below, attaches to the first and second fittings 260, 280. The ledge extends from the wall 228 and the ledge 227 extends above a portion of the pallet 2900 when positioned with respect to the system 200 to provide vertical support to the pallet 2900, as depicted in FIG. 11 with the edge pallet 2900c resting below the ledge 227. In some embodiments, the planar top surface 226 extends above both the elongate portion 223 and the second portion 230 of the elongate bar 220. The planar top surface 226 may be a continuous plane along the entire surface of the elongate bar 220, while in other embodiments, the planar top surface 226 may be different planar surfaces above the elongate portion and above the second portion, such as to provide the ledge 227 with a different material thickness at different locations along the elongate bar 220 as may be needed for strength considerations.

In some embodiments, the second portion 230 of the elongate bar 220 also includes a ledge 237, which also rests above the edge 2900c of the pallet 2900 such that the second portion 230 also provides vertical restraint to the pallet 2900 and the cargo disposed therein/thereon.

As further best understood with reference to FIG. 11, the wall 228 of the elongate bar 220 is positioned just next to the edge 2900c of the pallet 2900 such that the wall 228 provides aft restraint to the pallet, and the wall 238 of the second portion 230 provides outboard lateral restraint to the pallet 2900 (which, as discussed above, provides outboard lateral restraint above the stay out zone, thereby allowing cargo pallets to be positioned further aft within the fuselage (with support proximate at least the rear corner of the pallet 2900) than would be possible without the system 200.

In some embodiments, the rear edge 226a of the planar top surface along the extended portion forms the top edge of the rear surface of the wall 228 and a rear edge 236a of the planar top surface 236 within the second portion 230 forms the top edge of the rear surface of the wall 238 within the second portion 230.

In some embodiments, a transition portion 240 is disposed between the extended portion 223 and the second portion 230 of the elongate bar 220. The transition portion 240 may include a curved front edge and a curved portion of the ledge 247. The curved portion of the ledge 247 may allow for a continuous transition of the ledge between the ledge 227 within the extended portion 223 and the ledge 237 within the second portion 230. In some embodiments, the second portion 230 may extend forwardly of the transition portion 240 one inch, i.e. the ledge 237 has a constant width for 1 inch forwardly of the portion of the ledge with a varying width within the transition portion. In other embodiments, the length of the second portion 230 (i.e. the constant width portion of the ledge 237) may extend for different distances depending upon the size of the pallet to be restrained and the space available within the aircraft, such as a length between 0.5 inches to 10 inches and any distances within this range.

Figure 13:
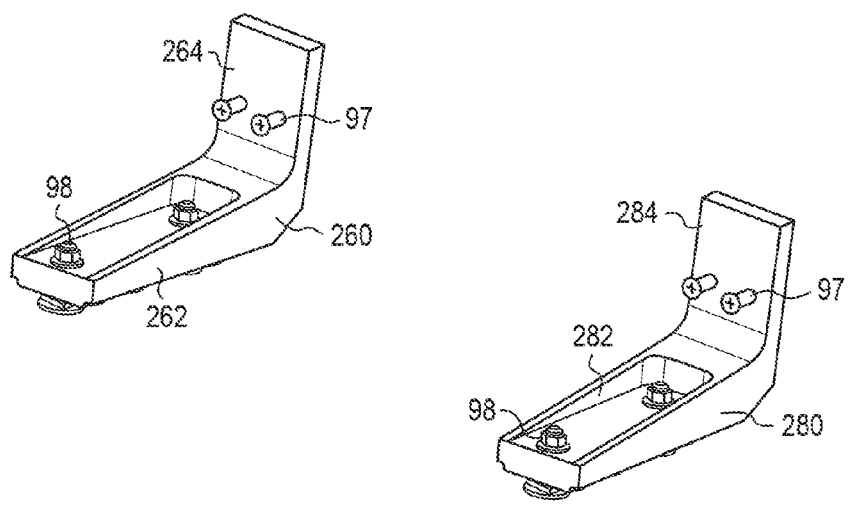
FIG. 13 is a perspective view of two end stops that support the elongate member of the system of FIG. 9.

The first and second fittings 260, 280 are best shown in FIG. 13. Both of the first fitting 260 and the second fitting 280 includes a first portion 262, 282 that rests upon and is fixed to a support structure within the aircraft, such as a seat track that rests upon the floor of the aircraft. The first and second fittings 260, 280 may be fixed to respective spaced first and second seat tracks 1y, 1z (FIG. 11) that are spaced inboard of the sidewall of the fuselage and directly inboard of the stay out zone 800. The first and second fittings 260, 280 may be fixed to the seat tracks with fasteners 98, as known in the art, which may be the same or different from fasteners 99 discussed above.

The first and second fittings 260, 280 each may have a second portion 264, 284 that extends from the first portion, in some embodiments upwardly therefrom, such as perpendicular thereto and in a vertical direction. The second portions 264, 284 both are fixed to and support the extended portion 222 of the elongate bar 220, such that a portion of the extended portion 222 and the second portion 230 extends therefrom in a cantilevered manner. The elongate bar 220, and specifically the wall 228, may be fixed to the second portions 264, 284 each with one or more fasteners 97. In some embodiments, the apertures (not shown) for the fasteners through the wall 228 includes a countersink portion that allows the head of the fastener 97 to extend within, such that the surface of the wall 228 is flat to allow for engagement of the edge 2900*c* with the wall 228.

In some embodiments, the tracks 1*z*, 1*y* that support the first and second fittings 260, 280 may be parallel and both extend in the fore to aft direction and parallel to the longitudinal axis of the aircraft. In other embodiments, the outboard most track 1*y* (FIG. 11) may be disposed at an acute angle to the next inboard seat track 1*z*, at least in the location where the system 200 is to be used, such that the seat tracks 1*z*, 1*y* are disposed at an acute angle β therebetween. In an embodiment where the tracks are at an angle with respect to each other, the second upstanding portion 284 of the second fitting is formed such that it's face may be aligned to be planar with the face of the upstanding portion 264 of the first fitting 260 (when both are installed) such that a planar portion of the wall 228 of the elongate member 220 can contact both fittings.

In embodiments, where the system 200 is used with the BOEING® 737-800 aircraft, the first and second fittings 260, 280 are connected to seat tracks that are disposed upon the LBL 45.5 and 54.5 lines, respectively. The term LBL refers to "Left Buttock Line" and is well known in the art to describe the distance laterally outboard of the front to rear centerline of the aircraft in inches.

The system 200 as depicted in FIGS. 9-13 is specifically configured to support and restrain pallets upon the port or left side of the aircraft as facing forward. One of ordinary skill in the art will understand with a thorough review of this specification and figures that a similar system 200 can be provided for use upon the starboard or right side of the aircraft when facing forward such upon seat tracks located at RBL ("Right Buttock Line" 45.5 and 54.5, respectively), and the construction of the elongate member 220 may be a mirror image of the elongate member across the centerline. The system 200 can also be modified to support pallets at different locations within an aircraft (or other means of transportation) where restraint needs to be provided above a location where a physical connection with the vehicle is not possible. In some embodiments, the system 200 may be provided to include separate elongate members 220 configured for vertical, aft, and outboard lateral support proximate to the rear right corner and the rear left corner of the pallet 2000 above the stay out zone of the aircraft.

While particular elements, embodiments, and applications of the present invention have been shown and described, it is understood that the disclosure is not limited thereto because modifications may be made by those skilled in the art, particularly in light of the foregoing teaching. It is therefore contemplated by the appended claims to cover such modifications and incorporate those features which come within the spirit and scope of the disclosure.

The invention claimed is:

1. A system for restraining palleted cargo within an aircraft, comprising:
   first and second beams connected together such that they are movably disposed with respect to each other in a first direction at a joint and fixed with respect to each other in two other mutually perpendicular directions,
   wherein the first and second beams are free to slide with respect to each other in the first direction to accommodate an aircraft's flexibility,
   the first beam when installed within the aircraft, is rigidly mountable to different locations on a wall mounted fixed structure of the aircraft,
   the second beam, when installed, is rigidly mountable to different locations on a floor mounted fixed structure of the aircraft, wherein the floor mounted fixed structure is a horizontal surface and the wall mounted fixed structure is disposed at a perpendicular or oblique angle with respect to the horizontal surface,
   the first and second beams are configured to be able to move along the wall mounted and floor mounted fixed structures of the aircraft in flight while palleted cargo is being restrained.

2. The system of claim 1, wherein the first and second beams are fixed together with a half lap joint.

3. The system of claim 2, further comprising a fastener that, when the first and second beams are connected together, extends through aligned first and second slots that extend through the portions of the respective first and second beams that form the lap joint, wherein a width of the slot in the portion of the lap joint formed by the second beam is wider than an outer diameter of a shaft of the fastener, such that the shaft of the fastener can slide within the second slot.

4. The system of claim 3, wherein the first slot is formed with opposed flat walls and with curved walls that connect adjacent ends of the opposed flat walls, and wherein the shaft of the fastener that extends through the first slot is correspondingly formed with opposed flat walls of the fastener with curved walls of the fastener that connect adjacent ends of the opposed flat walls of the fastener, wherein the fastener engages the first slot in a manner to prevent the fastener from rotating about the fastener's longitudinal axis when extending through the first slot.

5. The system of claim 3, wherein the first slot includes a countersunk portion that allows a head of the fastener to rest therein such that the head of the fastener is flush with or recessed within a side surface of the first beam.

6. The system of claim 3, wherein the second slot is ⅜ of an inch wider than the outer diameter of the shaft that extends through the second slot.

7. The system of claim 1, wherein the first beam supports one or more flipper restraints to restrain a cargo pallet contacting the first beam in a vertical direction when installed.

8. The system of claim 7, wherein the first beam restrains a cargo pallet contacting the first beam in an outboard lateral direction.

9. The system of claim 1, wherein the first beam is configured to be installed within an aircraft such that the first beam is parallel with a fore to aft longitudinal axis of an aircraft.

10. The system of claim 1, wherein the first beam is configured to be fixed to a first seat track mounted on a side wall of a BOEING® 737-800 fuselage proximate to a FS540 position, and the second beam is configured to be fixed to a second seat track mounted to a floor of the BOEING 737-800 fuselage proximate to a FS520 position.

11. The system of claim 1, wherein the first beam fixedly supports a first end of a cross track extending from a first side surface of the first beam with a second end of the cross track fixed to a horizontal floor track disposed inboard of the first beam.

12. The system of claim 11, wherein the cross track supports one or more roller supports.

13. The system of claim 11, wherein the cross-track supports a pivotable lateral restraint, which when set provides outboard lateral support and vertical support to a cargo pallet contacting the pivotable lateral restraint.

14. The system of claim 11, further comprising a bracket that is fixed to the first side surface of the first beam and to the first end of the cross track.

* * * * *